(12) United States Patent
Kaplinsky et al.

(10) Patent No.: US 7,202,894 B2
(45) Date of Patent: Apr. 10, 2007

(54) METHOD AND APPARATUS FOR REAL TIME IDENTIFICATION AND CORRECTION OF PIXEL DEFECTS FOR IMAGE SENSOR ARRAYS

(75) Inventors: Michael Kaplinsky, South Pasadena, CA (US); Igor Subbotin, South Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 756 days.

(21) Appl. No.: 10/160,556

(22) Filed: Jun. 4, 2002

(65) Prior Publication Data

US 2003/0222995 A1    Dec. 4, 2003

(51) Int. Cl.
- *H04N 9/64* (2006.01)
- *H04N 5/21* (2006.01)
- *H04N 5/213* (2006.01)
- *H04N 5/217* (2006.01)

(52) U.S. Cl. ............... 348/246; 348/247; 348/615; 348/616

(58) Field of Classification Search ........... 348/247, 348/246, 615, 616, 250, 311, 243; 382/274, 382/308

See application file for complete search history.

(56) References Cited

U.S. PATENT DOCUMENTS

| | | | |
|---|---|---|---|
| 4,541,116 A | | 9/1985 | Longheed |
| 4,894,721 A | * | 1/1990 | Matsuda ............... 348/247 |
| 5,198,906 A | | 3/1993 | Yamashita |
| 5,392,070 A | * | 2/1995 | Endo et al. ........... 348/247 |
| 5,504,504 A | | 4/1996 | Markandey et al. |
| 5,644,366 A | * | 7/1997 | Ushida et al. ........ 348/625 |
| 5,793,221 A | | 8/1998 | Aoki |
| 5,805,216 A | * | 9/1998 | Tabei et al. ........... 348/246 |
| 6,201,891 B1 | | 3/2001 | Ino et al. |
| 6,628,833 B1 | * | 9/2003 | Horie .................... 382/173 |
| 6,677,991 B1 | * | 1/2004 | Ito ....................... 348/220.1 |
| 6,683,643 B1 | * | 1/2004 | Takayama et al. ..... 348/247 |
| 6,724,945 B1 | * | 4/2004 | Yen et al. ............. 382/274 |
| 6,768,513 B1 | * | 7/2004 | Watanabe et al. ..... 348/246 |
| 6,806,902 B1 | * | 10/2004 | Donovan ............... 348/246 |
| 6,879,721 B2 | * | 4/2005 | Bradburn .............. 382/205 |
| 2001/0038416 A1 | | 11/2001 | Koren et al. |
| 2001/0052938 A1 | | 12/2001 | Itoh |
| 2002/0005904 A1 | | 1/2002 | Mendis |
| 2002/0015111 A1 | | 2/2002 | Harada |
| 2002/0122123 A1 | * | 9/2002 | Kimura ................. 348/246 |

FOREIGN PATENT DOCUMENTS

| | | |
|---|---|---|
| EP | 1003332 A2 * | 5/2000 |
| EP | 1003332 A3 | 7/2000 |
| KR | 2003-023294 | 3/2003 |

* cited by examiner

*Primary Examiner*—Ngoc-Yen Vu
*Assistant Examiner*—Gregory Madden
(74) *Attorney, Agent, or Firm*—Dickstein Shapiro LLP

(57) ABSTRACT

An image processing system and method compares each pixel of an image obtained from an image sensor array with at least eight surrounding pixels of the same color in the filter array. If the signal of a given pixel is larger than the respective signals of all eight surrounding pixels of the same color, then the value of that central pixel signal is substituted with the maximum signal value among the surrounding eight pixels of the same color. Similarly, if the signal of a given pixel is smaller than the respective signals of all eight surrounding pixels of the same color, then the value of that central pixel signal is substituted with the minimum signal value among the surrounding eight pixels of the same color.

16 Claims, 6 Drawing Sheets

| G | B | G | B | G |
|---|---|---|---|---|
| R | G | R | G | R |
| G | B | G | B | G |
| R | G | R | G | R |
| G | B | G | B | G |

FIG. 1
PRIOR ART

METHOD AND APPARATUS FOR REAL TIME IDENTIFICATION AND CORRECTION OF PIXEL DEFECTS FOR IMAGE SENSOR ARRAYS

FIELD OF THE INVENTION

The present invention relates to a method and apparatus that enables real time identification and correction of defective pixels in an image sensor array in a digital imaging environment.

BACKGROUND OF THE INVENTION

When an image is exposed onto an image sensor, each pixel records the amount of light that it "sees" as an intensity level between a dark signal wherein no light reaches that pixel, to a full white signal representing the maximum amount of light detectable by that pixel. The image thus captured by the image sensor is processed as a grayscale image.

To detect the colors of the image exposed onto the image sensor, the pixels of the image sensor are covered with a respective color filter that absorbs light wavelengths for all colors except the color of the filter. An exemplary method for acquiring color information from an image sensor is to place a color filter array over the pixels of an image sensor. The most common example of such a color filter array is a Bayer mosaic filter, shown in FIG. 1. The Bayer mosaic filter has a checkerboard like configuration and is composed of alternating rows of red and green, and blue and green filters. The red and blue filters are offset from each other so that no two green filters share an edge between adjacent rows and columns. To obtain complete color information for each pixel, it is necessary to interpolate the intensity of the colors based on the level of those colors at the surrounding pixels.

Although a typical image sensor has at least hundreds of thousands of pixels collecting color filtered information for an image, each pixel is important, not just for the signal value recorded in that pixel, but also for use in interpolating color information for other surrounding pixels. Thus, when a pixel is defective, its effects can be compounded to affect a significant portion of the image.

Due to a number of inherent variabilities in the manufacturing processes of image sensors such as charge-coupled devices (CCDs) or complementary metal oxide semiconductors (CMOSs), some of the pixels of the imaging array in each sensor are either always dark (often due to a short in the circuitry) or always too bright (often due to abnormally high leakage current). In most cases these defects can be corrected by substituting the defective signal values with the values of adjacent pixels during image processing. However, this substitution requires knowledge of the defective pixel locations.

In most cameras presently known, the locations of the defective pixels are determined during an off-line testing procedure during the production stage and are stored in a non-volatile memory in the camera. The main drawback of this conventional approach is that the number of defects that can be corrected is limited by the size of the non-volatile memory dedicated to this purpose. Another drawback of the conventional approach is that it requires a separate manufacturing step for the identification and storage of the defect locations.

Other existing camera modules perform correction of defective pixels by comparing each pixel with adjacent pixels, such as those on either side of the pixel in the same line, and performing substitution using threshold-based criteria. Such defect correction methods using comparisons based on predetermined thresholds tend to diminish resolution, as fine details such as thin vertical lines are "eliminated" from the image.

In view of the present state of the art, the process for correcting defective pixels would thus be greatly improved if the dedicated non-volatile memory currently required for storing the pre-calibrated defect map could be eliminated, and if the correction of defective pixels could be made without using threshold criteria.

BRIEF SUMMARY OF THE INVENTION

The present invention addresses the disadvantages of the prior art by providing a method and apparatus which enables real time correction of image data for an arbitrary number of both dark and bright defective pixels in an image sensor array without the need for a separate production-stage calibration to account for the defective pixels or a non-volatile medium to store a pre-calibrated defect map. The method and apparatus of the invention also enables the identification of defective pixel data without relying on a specific definition of a defect and without requiring the use of any specified thresholds against which potential defects are compared. The method and apparatus of the invention also enables correction of defective pixel data in an image regardless of the image contents and the correction of defective pixel data in an image without appreciably affecting the resolution of the image, and the correction of defective pixel data in an image, while also reducing peak-to-peak noise variations in the image.

An image processing system and method of the invention compares the signal of each pixel in an image with the respective signals of at least eight surrounding pixels of the same color in the filter array. If the signal of a given pixel is larger than the respective signals of all eight surrounding pixels of the same color, then the value of that central pixel signal is substituted with the maximum signal value among the surrounding eight pixels of the same color. Similarly, if the signal of a given pixel is smaller than the respective signals of all eight surrounding pixels of the same color, then the value of that central pixel signal is substituted with the minimum signal value among the surrounding eight pixels of the same color.

The present invention also includes the capability to detect a cluster of defective pixels in an image sensor pixel array, which may be performed after the defective pixel data identification and correction operation, and in which the absolute value of the difference between the signal values of two adjacent pixels of the same color type are compared against a threshold value, wherein a cluster defect is present if the absolute value of any difference between two signal values is determined to be greater than the threshold. Preferably, this operation is only performed during testing at the factory, but may also be configured to execute automatically in the imaging apparatus after completion of the defective pixel data identification and correction operation.

Other features and advantages of the present invention will become apparent from the following description of the invention with reference to the accompanying drawings.

BRIEF DESCRIPTION OF THE DRAWINGS

FIG. 1 is a diagram showing a known Bayer mosaic filter pattern used on an image sensor;

DETAILED DESCRIPTION OF THE INVENTION

Figure 2:
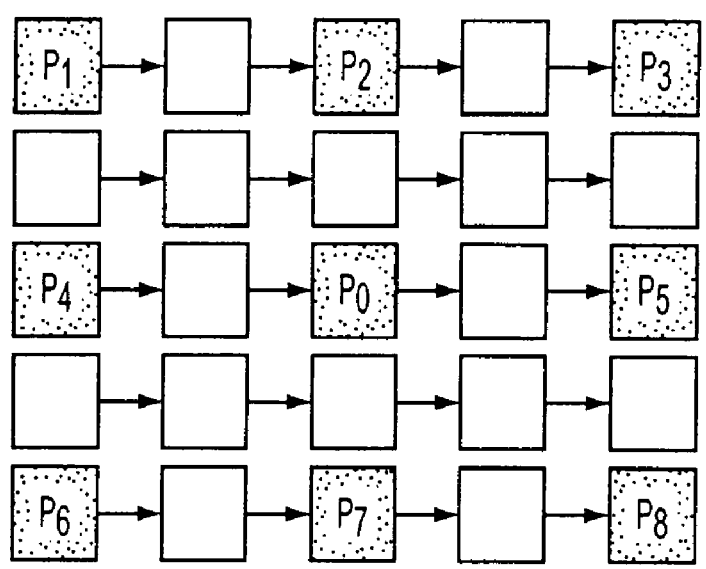
FIG. 2 is a diagram illustrating a method for identifying and correcting defective pixel data in accordance with the present invention.

In the method aspect of the present invention, the signal value of each pixel in an image obtained by an image sensor is compared with the values for at least eight closest surrounding pixels having the same color filter located adjacent to or near the pixel being tested. An example of this method will be described for an image obtained by an image sensor having a Bayer mosaic filter array. As illustrated in FIG. 2, the signal value of the central pixel, $P_0$, is compared with the signal values for each of the eight closest surrounding pixels of the same color. In this example, these eight closest surrounding pixels are located along the same row ($P_4$, $P_5$), column ($P_2$, $P_7$), and diagonally ($P_1$, $P_3$, $P_6$, and $P_8$) from the pixel being tested ($P_0$), each spaced one pixel away from $P_0$ in the relevant direction.

If the signal of $P_0$ is larger than the respective signals of all eight surrounding pixels $P_1$ through $P_8$, then the signal value for $P_0$ is substituted with the maximum signal value from among the signal values for pixels $P_1$ through $P_8$. Similarly, if the signal of $P_0$ is smaller than the respective signals of all eight surrounding pixels $P_1$ through $P_8$, then the signal value $P_0$ is substituted with the minimum signal value from among the signal values for pixels $P_1$ through $P_8$.

Stated in mathematical terms, if $P_0=\max(P_1, \ldots, P_8)$ or if $P_0=\min(P_1, \ldots, P_8)$, then $P_0=P_i$, where $P_i$ satisfies $|P_0-P_k|=\min|P_0-P_k|$, wherein $k=1, \ldots, 8$.

Since this method requires image data from two rows and columns on each side of a pixel being tested (one on each side for monochromatic filtered arrays), the method as described above does not account for checking and correcting, if necessary, the pixels in the two outermost rows and columns of the image obtained by the image sensor because pixels in these locations do not have two rows and columns of surrounding pixels. One solution is to provide a slightly larger pixel array in the image sensor than will be displayed or outputted from the apparatus in which the image processing system of the present invention is incorporated. Hence, the image data contained in these pixels from the one or two rows and columns at the edges of the image sensor pixel array are not checked for defects and are not displayed, but are used for checking the function of the relevant interior pixels according to the present invention.

The method described above is preferably performed automatically in an imaging apparatus, such as a camera, for each image captured by the imaging sensor provided in the apparatus, and is effective for 8-bit, 10-bit, 12- bit, etc. bit depths of pixel color for each color channel in the color filter array over an image sensor. The operation of these method is transparent to an end user of the apparatus, so that the user will only see the corrected image without the initial defects. Moreover, it is noted that if the imaging apparatus has passed the quality control tests performed at the factory and is being operated by the end user, the cluster defect detection method should always produce a negative result, indicating that no cluster defects are present.

However, this method is only suited to correct isolated defects occurring no more frequently than once per 3×3 or 5×5 or other subarray size as needed for testing each pixel. In the case of a cluster of defective pixels, the method fails and the device should be rejected at the production testing stage. A cluster is defined as two or more defects of the same color located next to each other. In a Bayer mosaic filtered array, a cluster would include two or more defective pixels of the same color which are spaced apart from each other by an intervening pixel of another color.

Figure 3:
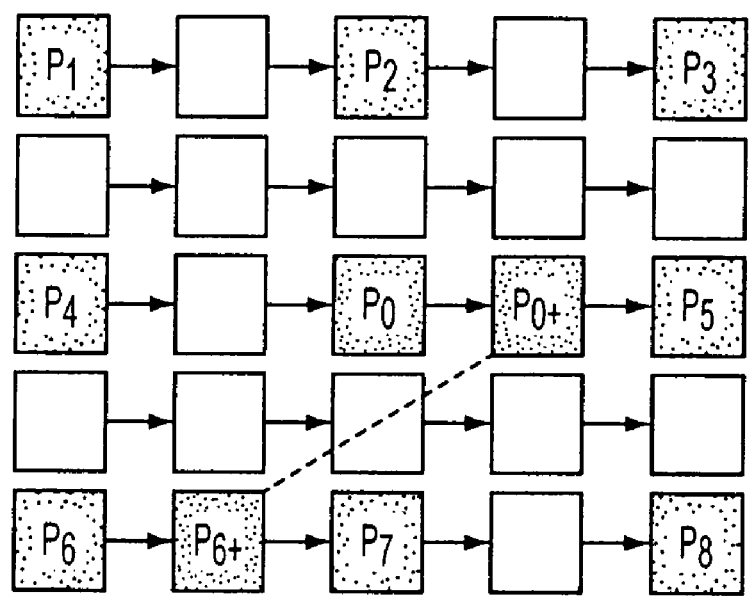
FIG. 3 is a diagram illustrating a method for detecting a cluster of defective pixels in an image sensor pixel array in accordance with the present invention.

Optionally, the capability to perform the following operation may be provided in the imaging apparatus to assist in determining the presence of clusters after the performance of the defect correction method described above. In this optional operation, the image sensor is uniformly illuminated following the defective pixel identification and correction process, and as illustrated in FIG. 3, the absolute value of the difference between the values of two adjacent pixels of a same color $P_{0+}$ and $P_{6+}$ is compared against a threshold value. Differences above the threshold level will be observed only if uncorrectable cluster defects are present in the image sensor. Stated mathematically, a cluster of defective pixels is present if, after execution of the defect correction process, $$|P_{0+}-P_{6+}|>T_{th}.$$

The cluster defect detection operation may be set to be performed automatically in the imaging apparatus after a completion of the defective pixel data identification and correction operation, but is preferably controlled, such as by a switch in the system hardware, to be operated at the production stage after a complete test execution of the defective pixel data identification and correction operation. When performed at the factory during a production stage or quality control procedure, a successful execution of this cluster detection test serves as a verification that the image sensor is free of cluster defects. However, if the test yields a result which is greater than the threshold value, a cluster of defective pixels is present, and the image sensor should be discarded.

Figure 1:
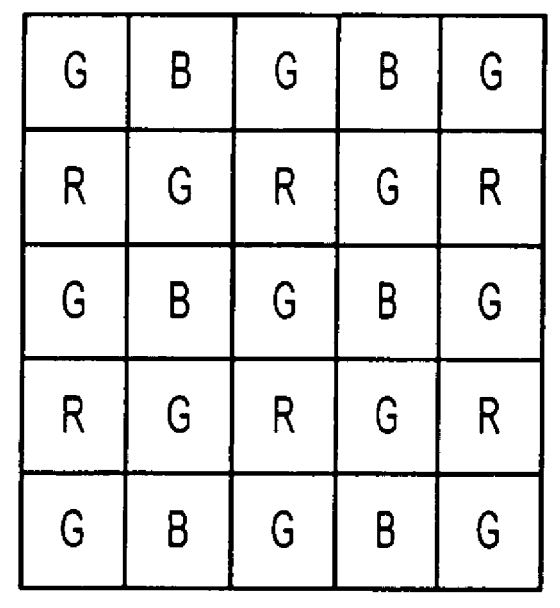

The defective pixel data identification and correction method described above is implemented in a system which includes a memory structure capable of holding image information obtained from at least a 3×3 subset, and preferably a 5×5 subset, of a pixel array of an image sensor. For example, if the architecture of the image sensor provides a monochrome image, such as by having a monochrome filter over the entire pixel array or by producing an image in grayscale, only three lines of storage are necessary for the memory frame because each pixel is immediately surrounded by eight pixels of the same color as the one to be tested. If, on the other hand, the image sensor architecture includes a multi-colored filter array, such as a Bayer mosaic filter in which rows of red and green alternating pixels are alternatingly arranged with rows of blue and green alternating pixels as shown in FIG. 1, then the memory structure of the present invention is capable of holding at least five lines of image information. Alternatively, the memory structure may be of any other size necessary for accommodating any other type of image sensor filter arrangement. As a further alternative, the buffer memory may be a full frame buffering memory capable of holding pixel information for an entire image.

Figure 4:
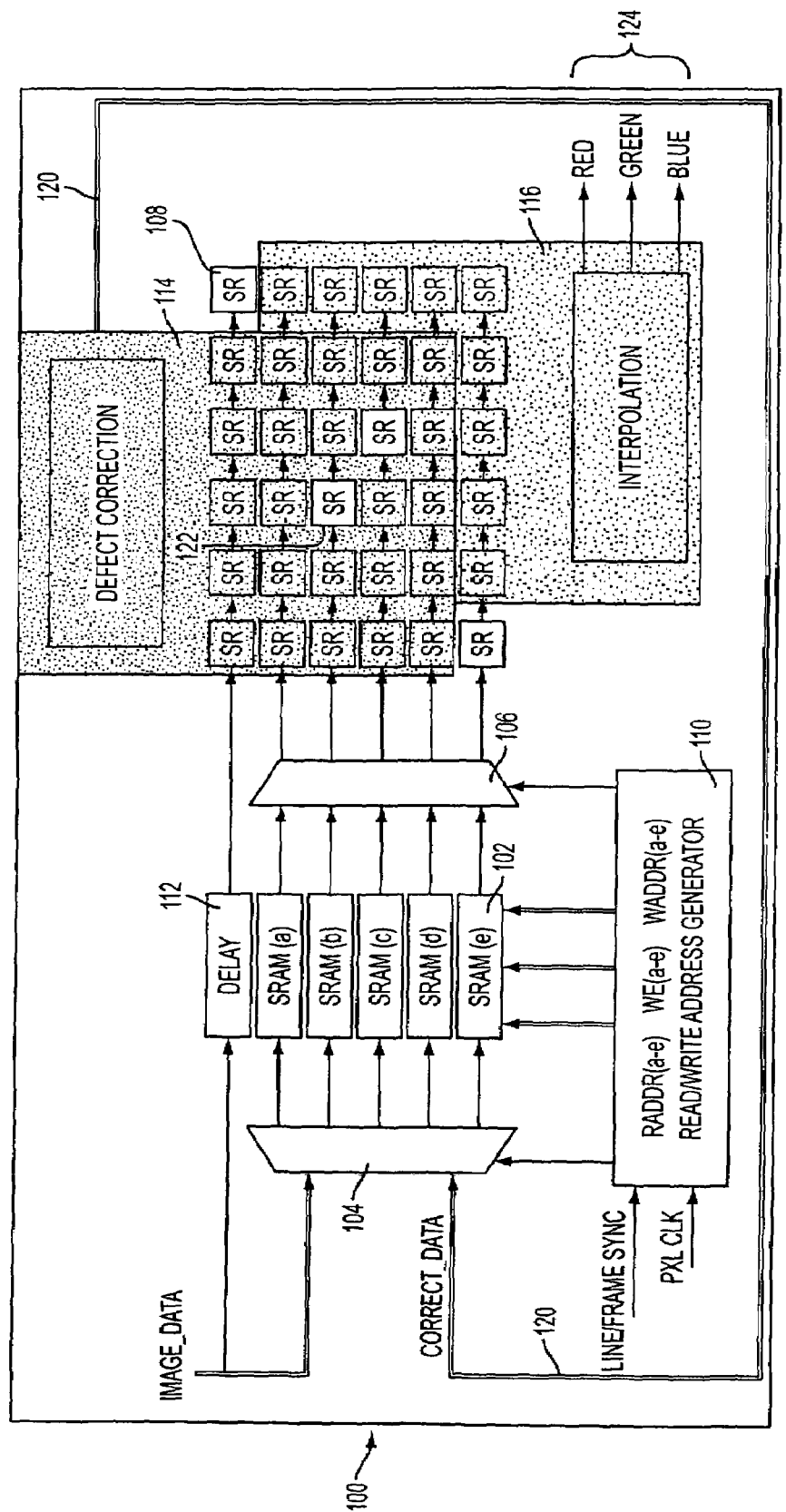
FIG. 4 is a diagram illustrating a processing unit implementing the defective pixel data identification and correction method of the present invention.

FIG. 4 is a diagram illustrating a preferred embodiment of a processing unit 100 incorporated in an image processor and which implements the correction method described above. In the preferred embodiment, the processing unit 100 includes six rows of shift registers 108 for receiving image data, a delay circuit 112 for transferring a most recent line of image data into one of the rows of shift registers 108 in column synchrony with input of data into other rows of shift registers, five banks of random access memory (RAM) 102 for storing an equal number of previously read in lines of image data, a read/write address generator 110 for controlling the flow of data into and out of the RAM banks 102, a input multiplexer 104 for inputting the image data into the appropriate RAM as determined by the read/write address generator 110, an output multiplexer 106 for outputting the image data from the RAM banks 102 into the appropriate row of shift registers 108 as determined by the read/write address generator 110, a defect correction circuit for performing defective pixel data identification and correction as described above, and optionally, a second two-dimensional interpolation image processing operation circuit 116 for producing red, green and blue output signals.

For a monochrome image sensor array, since only three rows of shift registers are needed to perform the defective pixel data identification and correction operation fewer RAM banks 102 and rows of shift registers 108, e.g., three RAM banks 102 and four rows of shift registers 108, are needed.

In the preferred embodiment, each memory bank is a dual-ported SRAM (static RAM) allowing simultaneous read/write access. However, other types of random access memories may be used, such as any of the many different subspecies of DRAMs, including, for example, fast page mode DRAM (FPM DRAM), extended data out DRAM (EDO DRAM), burst EDO DRAM, synchronous DRAM (SDRAM), double data rate DRAM (DDR DRAM), Rambus DRAM (RDRAM), etc.

Additionally, the delay circuit can be embodied as a RAM or any other device, or may be substituted with any other mechanism through which an incoming line of image data can be transferred directly into the shift registers in column synchrony with the image data entering the shift registers through the RAM banks 102. In the preferred embodiment, however the delay circuit 112 is simply provided as a delay register which delays the input of a new line of image data into an upper row of the shift registers 108 to maintain pixel column synchronism with pixel data input into the remaining rows of shift registers from the RAM banks 102.

The six sets of shift registers 108 provide simultaneous access to six lines of image data (fewer lines are needed for a monochrome image array) to enable both pixel defect correction and another two-dimensional interpolation processing function to be performed while sharing the same shift register hardware as used for defect correction. As mentioned above, the most recent line of image data is transferred to the top row of shift registers shown in FIG. 4, while the next most recent line of image data is inputted into the second row of shift registers from one of the RAM banks 102, and so forth, with the sixth most recent line of image data being inputted into the last row of shift registers shown in FIG. 4.

The particular RAM bank from which data is being transferred into each respective row of shift registers 108 is determined by a pointer in address generator 110 which operates a switch provided in the output multiplexer 106. The data in the RAM banks 102 are read out to the shift registers 108 pixel by pixel in FIFO order. Also, the image data from the delay register 112 is synchronized with the output from the memory banks 102 so that the image data being fed into one set of the shift registers by the delay register is from the same column of the image array as the pixel information being read out of the five banks of memory into the other five sets of shift registers.

The architecture described above allows for defect correction to be performed at the pixel clock rate prior to further processing steps in the image processor. The identification and correction of defective pixels occurs in the shift registers by the defect correction circuit 114, and is sequentially performed for pixel data in the third row of shift registers using the data read into the first five rows of shift registers. Specifically, pixel data from each line of image data in the memory banks 102 is parsed into the appropriate shift registers in synchronization with the pixel clock rate, and detection and correction of data for defective pixels is performed for the central pixel 122 shown in the defect correction circuit 114 of the shift register array. Once the pixel data currently in the center of the defect correction circuit 114 has been checked and corrected, if necessary, the data in the shift register array shifts to the right, with new pixel data being read into the left most column of shift registers from the respective RAM banks 102 and the delay register 112, to check the pixel data for the next pixel to the left in the same line.

This process is repeated until all of the pixel data in the relevant image line, i.e. the third row of shift registers, has been checked and corrected, if necessary. As each line of image data is being moved through the shift registers, the RAM bank containing the oldest line of image data which is moving through the sixth row of shift registers is also being loaded with the new line of pixel data entering the first row of shift registers under control of the input multiplexer 104 and address generator 110. Thus, the old image data is overwritten as it is being read out to the sixth line of shift registers via the output multiplexer 106. As a result, the RAM bank reading out the oldest line of image data is loaded with the newest line of image data currently entering the first row of shift register. This RAM will thus contain pixel image data to be loaded into the second row of shift registers for correcting the next line of image data.

Upon reaching the end of the image data lines, the read/write address generator 110 updates the output multiplexer 106 so that the RAM bank 102 containing the line of image data just checked by the defect correction circuit 114 is rerouted to read out its contents to the fourth row of shift registers shown in FIG. 4, while the RAM bank 102 previously outputting its image data to the fourth row of shift registers is now configured to output to the fifth row of shift registers. Similarly, the RAM bank previously configured to read out its line of image data into the fifth row of shift registers is now rerouted to read out to the sixth row of shift registers, and the RAM bank previously outputting to the second row of shift registers is now configured to output to the third row of shift registers. As explained above, the image data previously read into the first row of shift registers is now resident in the RAM bank 102 previously holding the oldest line of image data and is now routed to the second row of shift registers.

The image data in the RAM banks 102 is then read out to the shift registers from left to right, as in the previous iteration, to begin the process anew for the line of pixel data now present in the third row of shift registers 108. Also, the next incoming line of image data is read into the first row of shift registers in column synchrony with the image data entering the second through sixth rows of shift registers from the RAM banks 102. In the preferred embodiment, column synchronization of the image data being read into the first row of shift registers relative to the remaining rows is achieved by a delay register 112 as shown in FIG. 4, although this may be achieved using any of the other means mentioned above.

Since the data buffered in the memory banks is used repeatedly, i.e. once for each line in the five RAM banks (three for monochrome image arrays), it is necessary to update the memory contents once a defect is found and corrected. The corrected value is written into the central shift register 122 in defect correction circuit 114 and also back into the appropriate pixel location in the RAM bank 102, via the input multiplexer 104, corresponding to the row of shift registers on which defect correction is being made (120 in FIG. 4).

Once the defect correction is performed, the same set of shift-registers can be used (with a delay of one line and one pixel) to perform other two-dimensional image processing operations such as color interpolation, indicated, for example, as circuit 116 in FIG. 4. Other image processing operations such as sharpness filtering, white balancing, etc. can also be performed by circuit 116 to produce a red, green and blue output signal 124.

For a monochrome image sensor array, the operation of the processing unit 100 is the same as described above, except that fewer RAM banks and rows of shift registers are provided, and the output signal 124 from the two-dimensional image processing circuit 116 will only have the color of the monochrome image.

Figure 5:
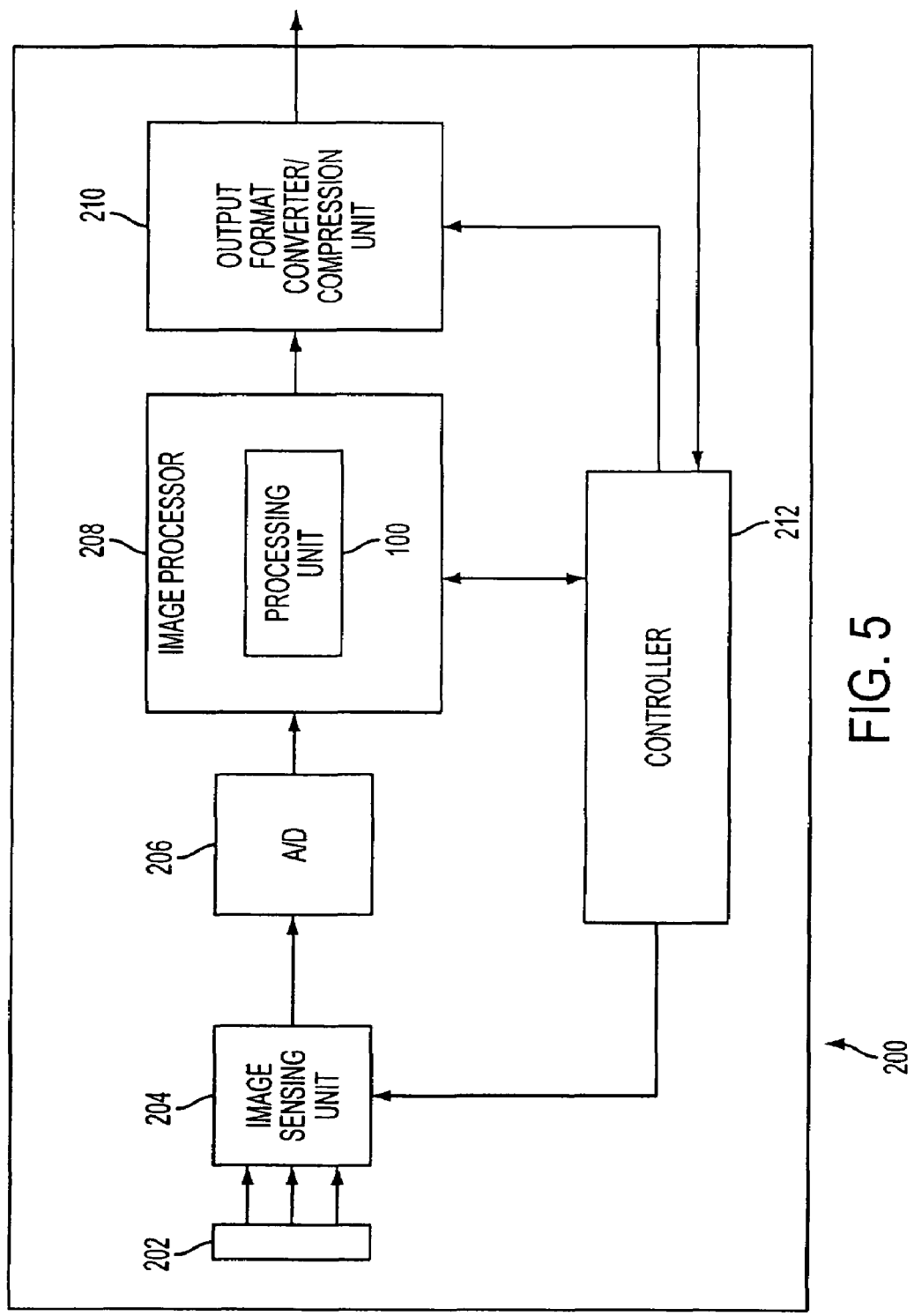
FIG. 5 is an illustration of an imaging apparatus incorporating the defective pixel data identification and correction system and method of the present invention.

An example of an imaging apparatus 200 incorporating the features of the present invention discussed above is shown in FIG. 5, and includes a lens system 202 for directing light from an object to be imaged to the image sensing unit 204 including an image sensor; an analog-to-digital converter 206 for converting the image signals received at the image sensing unit 204 into digital signals; the image/color processing unit 208 for performing image correction processes including the data correction for defective pixels as described above and also for performing other processes such as color interpolation, sharpness filtering, white balancing, etc.; an output format conversion/compression unit 210 for converting the image data into an appropriate file format for being outputted or displayed to the user; and a controller 212 for controlling the operations of the entire imaging apparatus 200.

The image sensor in the image sensing unit 204 is preferably constructed as an integrated circuit which includes pixels made of a photosensitive material such as silicon. The image sensor may be formed as a CMOS sensor and combined with a processor, such as a CPU, digital signal processor or microprocessor, in a single integrated circuit. Alternatively, the image sensor in the image sensing unit 204 may be constructed as a charge coupled device (CCD).

Without being limiting, such an imaging apparatus 200 could be part of a computer system, camera system, scanner, machine vision system, vehicle navigation system, video telephone, surveillance system, auto focus system, star tracker system, motion detection system, image stabilization system and data compression system for high-definition television, all of which can utilize the present invention.

Figure 6:
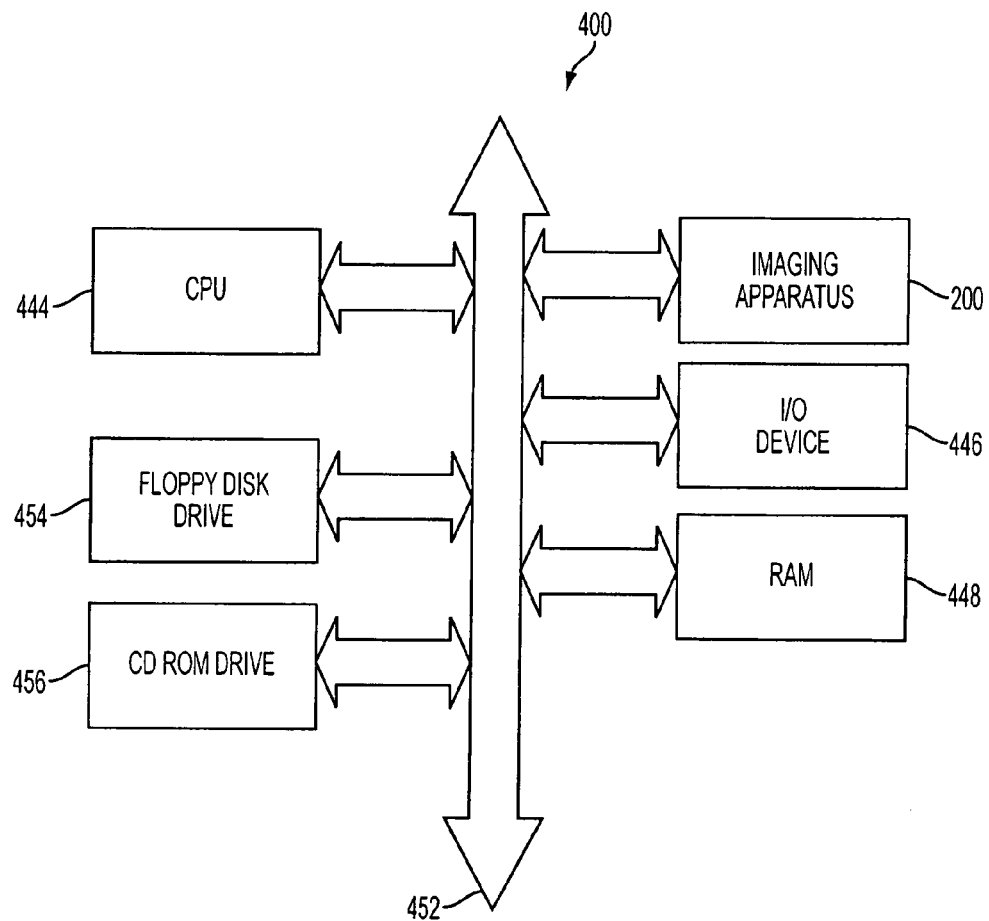
FIG. 6 is an illustration of a processing system communicating with an imaging apparatus of the present invention.

An exemplary processor system 400 to which the imaging apparatus 200 may be connected is shown in FIG. 6. The processing system 400, such as a computer system, for example, generally comprises a central processing unit (CPU) 444 that communicates with an input/output (I/O) device 446 over a bus 452. The imaging apparatus 200 communicates with the system over bus 452 or a ported connection. The processor system 400 also includes random access memory (RAM) 448, and, in the case of a computer system, may include peripheral devices such as a floppy disk drive 454 and a compact disk (CD) ROM drive 456 which also communicate with CPU 444 over the bus 452.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed as new and desired to be protected by Letters Patent of the United States is:

1. An apparatus for correcting pixel image data, comprising:
   a plurality of memory banks each for receiving and temporarily storing a line of image data of an image obtained from an image sensor array, each line containing signal value data respectively corresponding to a line of pixels in the array;
   a plurality of sets of shift registers for each memory bank for receiving the image data from the plurality of memory banks;
   a correction circuit for testing the signal value of a test pixel in the image data in one of the sets of shift registers, determining if the signal value of the test pixel is defective, and correcting the defective signal value if found to be defective by comparing the signal value of a test pixel with the signal values of at least eight pixels surrounding the test pixel in the image, and replacing the signal value of the test pixel with one of either the largest signal value from among the eight surrounding pixels or the smallest signal value from among the eight surrounding pixels, leaving the signal values of the eight surrounding pixels unchanged; and
   a delay register for inputting a line of image data directly from the image sensor array into one of the plurality of sets of shift registers in column synchrony with the image data being inputted into the shift registers from the memory banks.

2. An apparatus for correcting pixel image data, comprising:
   a plurality of memory banks each for receiving and temporarily storing a line of image data of an image obtained from an image sensor array, each line containing signal value data respectively corresponding to a line of pixels in the array;
   a plurality of sets of shift registers for each memory bank for receiving the image data from the plurality of memory banks;
   a correction circuit for testing the signal value of a test pixel in the image data in one of the sets of shift registers, determining if the signal value of the test pixel is defective, and correcting the defective signal value if found to be defective by comparing the signal value of a test pixel with the signal values of at least eight pixels surrounding the test pixel in the image, and replacing the signal value of the test pixel with one of either the largest signal value from among the eight surrounding pixels or the smallest signal value from among the eight surrounding pixels, leaving the signal values of the eight surrounding pixels unchanged; and an image processing circuit for performing an image processing operation on a pixel of the image data already tested, the image processing circuit using a portion of the shift registers which is offset from the shift registers in which the test pixel has been tested.

3. The apparatus of claim 2, wherein the image processing circuit is further provided for performing a color processing operation.

4. The apparatus of claim 2, wherein the image processing circuit is further provided for performing a color interpolation operation.

5. The apparatus of claim 2, wherein the image processing circuit is further provided for performing a white balancing operation.

6. The apparatus of claim 2, wherein the image processing circuit is further provided for performing a sharpness filtering operation.

7. A method for correcting pixel image data, comprising:
a) obtaining at least three lines of image data containing signal values for a corresponding number of lines of an image obtained from a pixel array in an image sensor;
b) comparing a signal value of a test pixel from among the at least three lines of signal values with the respective signal values of at least eight pixels from among the at least three lines of signal values and which surround the test pixel, having the eight surrounding pixels the same color type as the test pixel;
c) if the signal value of the test pixel is larger than all of the signal values for the eight surrounding pixels, redefining the signal value of the test pixel to be equal to the maximum signal value from among the signal values of the eight surrounding pixels, leaving the signal values of the eight surrounding pixels unchanged; and
d) if the signal value of the test pixel is smaller than all of the signal values for the eight surrounding pixels, redefining the signal value of the test pixel to be equal to the minimum signal value from among the signal values of the eight surrounding pixels, leaving the signal values of the eight surrounding pixels unchanged,
wherein the comparing act is not performed for the signal values of the pixels from the outermost two rows and columns in the image sensor pixel array.

8. A method for correcting pixel image data, comprising:
a) obtaining at least three lines of image data containing signal values for a corresponding number of lines of an image obtained from a pixel array in an image sensor;
b) comparing a signal value of a test pixel from among the at least three lines of signal values with the respective signal values of at least eight pixels from among the at least three lines of signal values and which surround the test pixel, having the eight surrounding pixels the same color type as the test pixel;
c) if the signal value of the test pixel is larger than all of the signal values for the eight surrounding pixels, redefining the signal value of the test pixel to be equal to the maximum signal value from among the signal values of the eight surrounding pixels, leaving the signal values of the eight surrounding pixels unchanged; and
d) if the signal value of the test pixel is smaller than all of the signal values for the eight surrounding pixels, redefining the signal value of the test pixel to be equal to the minimum signal value from among the signal values of the eight surrounding pixels, leaving the signal values of the eight surrounding pixels unchanged;
e) repeating acts a) through d) for a next pixel in the same line of image data as the tested pixel, until all the pixels in the line have been tested;
f) obtaining a new line of signal values for an new line of image data from the image sensor pixel array; and
g) repeating act e) on a next line of image data and also repeating act f) until all the signal values for each pixel in each line of image data have been tested;
h) verifying that no cluster of defective pixels is present after testing each pixel in each line of image data by;
i) selecting a first pixel from among the tested image data;
j) selecting a second pixel from among the closest surrounding pixels to the first pixel of the same color type as the first pixel;
k) obtaining a difference in signal values between the first pixel and second pixel;
l) comparing the absolute value of the difference to a threshold value, wherein a cluster of defective pixels is determined to be present if the absolute value of the difference is greater than the threshold value; and
m) repeating acts i) through l) for each pixel in the tested image data.

9. A method for correcting pixel image data, comprising:
writing at least three lines of image data containing signal values for a corresponding number of lines of an image obtained from a pixel array in an image sensor, into a plurality of memory banks;
sequentially inputting the image data from the memory banks into a plurality of sets of shift registers;
comparing a signal value of a test pixel in the shift registers with the signal values of at least eight surrounding pixels in the shift registers and which are of a same color filter type as the test pixel;
if the signal value of the test pixel is larger than all of the signal values of the eight surrounding pixels, correcting the signal value of the test pixel to be equal to the largest signal value from among the eight surrounding pixels, leaving the signal values of the eight surrounding pixels unchanged;
if the signal value of the test pixel is smaller than all of the signal values of the eight surrounding pixels, correcting the signal value of the test pixel to be equal to the smallest signal value from among the eight surrounding pixels, leaving the signal values of the eight surrounding pixels unchanged;
inputting a line of image data directly into a set of shift registers separately from the plurality of memory banks, but in column synchrony with the lines of image data being inputted into the shift registers from the memory banks,
wherein a portion the signal values of the at least eight surrounding pixels for being compared with the signal value of the test pixel are selected from among the image data inputted directly into the shift registers.

10. A method for correcting pixel image data, comprising:
writing at least three lines of image data containing signal values for a corresponding number of lines of an image obtained from a pixel array in an image sensor, into a plurality of memory banks;
sequentially inputting the image data from the memory banks into a plurality of sets of shift registers;

comparing a signal value of a test pixel in the shift registers with the signal values of at least eight surrounding pixels in the shift registers and which are of a same color filter type as the test pixel;

if the signal value of the test pixel is larger than all of the signal values of the eight surrounding pixels, correcting the signal value of the test pixel to be equal to the largest signal value from among the eight surrounding pixels, leaving the signal values of the eight surrounding pixels unchanged;

if the signal value of the test pixel is smaller than all of the signal values of the eight surrounding pixels, correcting the signal value of the test pixel to be equal to the smallest signal value from among the eight surrounding pixels, leaving the signal values of the eight surrounding pixels unchanged; and upon correcting the signal value of the test pixel, replacing the corrected value in the corresponding location in the corresponding memory bank.

11. A method for correcting pixel image data, comprising:

writing at least three lines of image data containing signal values for a corresponding number of lines of an image obtained from a pixel array in an image sensor, into a plurality of memory banks;

sequentially inputting the image data from the memory banks into a plurality of sets of shift registers;

comparing a signal value of a test pixel in the shift registers with the signal values of at least eight surrounding pixels in the shift registers and which are of a same color filter type as the test pixel;

if the signal value of the test pixel is larger than all of the signal values of the eight surrounding pixels, correcting the signal value of the test pixel to be equal to the largest signal value from among the eight surrounding pixels, leaving the signal values of the eight surrounding pixels unchanged;

if the signal value of the test pixel is smaller than all of the signal values of the eight surrounding pixels, correcting the signal value of the test pixel to be equal to the smallest signal value from among the eight surrounding pixels, leaving the signal values of the eight surrounding pixels unchanged;

upon correcting the signal value of the test pixel, replacing the corrected value in the corresponding location in the shift registers.

12. A method for correcting pixel image data, comprising:

writing at least three lines of image data containing signal values for a corresponding number of lines of an image obtained from a pixel array in an image sensor, into a plurality of memory banks;

sequentially inputting the image data from the memory banks into a plurality of sets of shift registers;

comparing a signal value of a test pixel in the shift registers with the signal values of at least eight surrounding pixels in the shift registers and which are of a same color filter type as the test pixel;

if the signal value of the test pixel is larger than all of the signal values of the eight surrounding pixels, correcting the signal value of the test pixel to be equal to the largest signal value from among the eight surrounding pixels, leaving the signal values of the eight surrounding pixels unchanged;

if the signal value of the test pixel is smaller than all of the signal values of the eight surrounding pixels, correcting the signal value of the test pixel to be equal to the smallest signal value from among the eight surrounding pixels, leaving the signal values of the eight surrounding pixels unchanged;

after the comparing act and, if necessary, the correcting act have been performed for the test pixel, performing a subsequent image processing function using an offset portion of the shift registers from those used to test the test pixel.

13. The method according to claim 12, wherein the subsequent image processing function is a color processing function.

14. The method according to claim 12, wherein the subsequent image processing function is a color interpolation function.

15. The method according to claim 12, wherein the subsequent image processing function is a sharpness filtering function.

16. The method according to claim 12, wherein the subsequent image processing function is a white balancing function.

* * * * *

UNITED STATES PATENT AND TRADEMARK OFFICE
CERTIFICATE OF CORRECTION

PATENT NO. : 7,202,894 B2  Page 1 of 1
APPLICATION NO. : 10/160556
DATED : April 10, 2007
INVENTOR(S) : Michael Kaplinsky et al.

It is certified that error appears in the above-identified patent and that said Letters Patent is hereby corrected as shown below:

Column 4, line 2, "these" should read --this--.

Claim 8, column 10, line 9, "for an new" should read --for a new--; and

Claim 9, column 10, line 57, "portion the" should read --portion of the--.

Signed and Sealed this

Third Day of July, 2007

JON W. DUDAS
*Director of the United States Patent and Trademark Office*